Dec. 13, 1932.  P. M. LINCOLN  1,890,909
THERMOSTATIC ELEMENT
Filed Aug. 22, 1929

Inventor.
Paul M. Lincoln.

by
H. J. S. Dennison
atty.

Patented Dec. 13, 1932

1,890,909

UNITED STATES PATENT OFFICE

PAUL M. LINCOLN, OF ITHACA, NEW YORK

THERMOSTATIC ELEMENT

Application filed August 22, 1929. Serial No. 387,662.

The principal objects of the invention are to provide a thermostatic element which will be very positive and dependable in its operation and may be applied to numerous uses.

The principal feature of the invention consists in the novel use of the expansible quality of soft rubber under an increase of temperature, whereby the rubber is confined against expansion in certain directions but is free to expand in other directions and to exert its expansile movement and force in operating various forms of thermostatically controlled devices.

In the accompanying drawing, Figure 1 is a diagrammatic sectional view showing the application of the present invention to an air control valve for radiators.

It has been previously proposed to utilize hard rubber or vulcanite together with metallic members to create a differential expansion and contraction due to change in temperature and operate thermostatic devices thereby.

The present invention proposes the use of soft rubber alone as the thermostatic element, it being necessary to confine the soft rubber to permit its expansion to take place in certain definite directions in order to accomplish the desired result.

Figure 1:
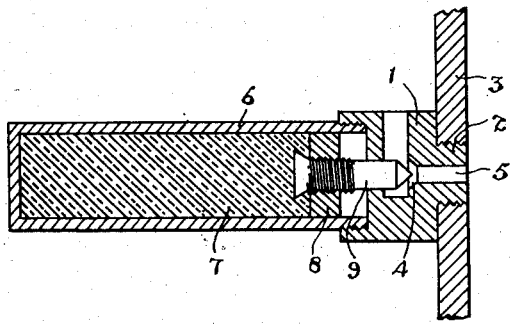

In the diagrammatic illustration of the invention shown in Figure 1, the invention is applied to an air valve commonly used on steam radiators, the function of which is to permit the escape of air but to prevent the escape of steam.

In the device herein shown, a valve block 1 which is provided with a threaded plug 2 to be inserted into the wall 3 of a radiator, is provided with a valve seat 4 at the outer end of an opening 5 connecting with the interior of the radiator.

Attached to the block 1 is a closed tube 6 which is preferably formed of metal and which will be a good conductor of heat.

Within the tube 6 is arranged a plug 7 of soft rubber. This rubber is fitted snugly into the tube so that it is initially under a slight compression and has secured to one end thereof a plunger 8 to which is secured a valve 9 adapted to close against the valve seat 4. The plunger thus acts as a piston in the tube.

The plunger 8 is movable longitudinally within the cylinder 6 in accordance with the expansion and contraction of the rubber.

Rubber is an extremely elastic material but it is possessed of the peculiar quality of being practically incompressible and it is very susceptible to the influence of changes of temperature. When therefore a body of soft rubber is enclosed and is free to expand under temperature change in only certain definite directions, the force exerted in such expansion is very positive and strong and when applied to a valve structure such as shown and described, the heat from the radiator is conveyed through the metallic block 1 and cylinder 2 to the rubber and the rubber in expanding forces the valve 9 into operating contact with the valve seat 4 to close the same.

The operation of this valve is extremely simple. When the radiator becomes cool the rubber contracts within its enclosure 6 and drawing the plunger 8 inwardly opens the valve 9. When steam enters the radiator the air is expelled therefrom through the opening 5 but upon the temperature increasing through the effect of the steam approaching the air vent, the rubber expands and pressing the plunger outwardly closes the valve.

Figure 2:
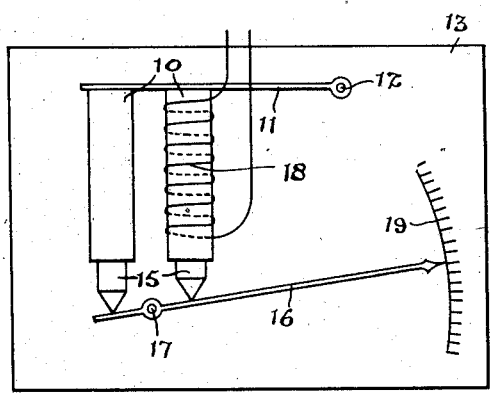
Figure 2 is a diagrammatic plan view showing the application of this invention to an electric meter.
Figure 3:
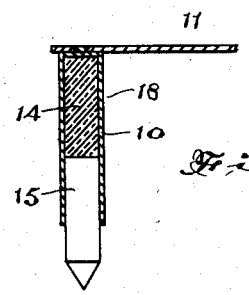
Figure 3 is a longitudinal sectional view of the thermostatic heat controlled element shown in Figure 2.

In the form of application of the invention diagrammatically illustrated in Figures 2 and 3, a pair of cylinders 10 closed at one end are secured to an arm 11 which is pivotally mounted at the point 12 on a suitable base 13.

The tubes 10 may be of metal or any other pressure resisting material and within the bore of the cylinders 10 is placed a plug 14 of soft rubber, preferably fitting the bore snugly so that it is under slight tension or compression whereby further expansion toward the confining walls of the tubes is definitely obviated. It will thus be seen that the total volumetric variations of the rubber in expanding or contracting will be preserved and the resultant movement or displacement of the rubber body will be concentrated at its point of non-confinement and the movement at this point will be of an amplified character since such movement represents the total volumetric expansion or contraction of the mass of rubber. Thus an extremely sensitive action is obtained which will accurately indicate the change in the rubber body in direct proportion to the change in temperature of the body. Thus it will be evident that an increase in the size of the rubber body under confinement with a given size of outlet or non-confined area will effect a proportionate increase or amplification of the movement of the rubber body at such point so that an extremely sensitive condition may be obtained.

Further, the movement of the body at the point of non-confinement say in the expansion period is very positive and definite. This will be found extremely desirable, particularly since the tremendous force set up enables the direct application thereof to the operation of means requiring such force, the field of application being thereby greatly increased.

A metal or other plug 15 of a hard nature is slidably mounted in the open end of each of the cylinders 10 and it is adapted to slide freely therein to follow the expansion and contraction movement of the rubber.

An arm 16 which is here shown as an indicator arm is pivotally secured to the base at a point 17, preferably between the points of the members 15 of the cylinders 10.

One of the cylinders 10 has a heater coil 18 wrapped therearound. This heater coil is in the present instance intended to be connected to a suitable electric circuit and current will flow therethrough and impart a certain heat to the cylinder 10 in proportion to the resistance of the heater so that a direct relation between the current and the heat generated exists. The heat thus applied to one of the cylinders 10 is imparted to the rubber plug contained therein and causes it to expand, oper- application of the present invention which is extremely simple, but it must be understood that other forms may be designed and utilized without departing from the spirit of the invention, which is to utilize the expansion force of soft rubber under changing temperature conditions to operate devices of various kinds adapted to be thermostatically controlled.

Where the present invention is desired to be utilized say as an operative medium functioning at low temperatures, say at freezing or lower, it will be understood of course that the initial compression or tension imparted to the rubber body by reason of its close or snug fit within the confining casing will be such that the body, due to contraction at the lower temperatures, will not entirely lose the initial compression and will at all times bear against the confining walls of the enclosing tube at a greater or lesser pressure as determined by the temperature changes.

What I claim as my invention is:—

1. A thermostatic device, comprising in combination an arm pivotally mounted at one end, a pair of cylinders open at one end rigidly secured to the free end of said arm and spaced apart, a rubber core inserted in each of said cylinders, a plunger arranged in each of said cylinders and having pointed ends extending from the open ends of said cylinders, an indicator arm pivotally mounted and engaged on opposite sides of its pivot by the respective pointed ends of said plungers, and means for differentially applying heat to said cylinders.

2. A thermostatic device, comprising a pair of soft rubber bodies each separately confined under permanent compression whereby the total volumetric expansive effort may be utilized, means for differentially heating said compressed rubber bodies, and means for measuring the difference in the total volumetric expansion of said soft rubber bodies.

3. A thermostatic device, comprising the for differentially heating said expansible rubber bodies.

5. A thermostatic device as claimed in claim 4 in which the weight of said cylinders, rubber bodies and plungers are suspended in a floating manner by engagement of the plungers with said arm, the cylinder axes and arm being disposed respectively in substantially vertical and horizontal relation.

PAUL M. LINCOLN.